UNITED STATES PATENT OFFICE.

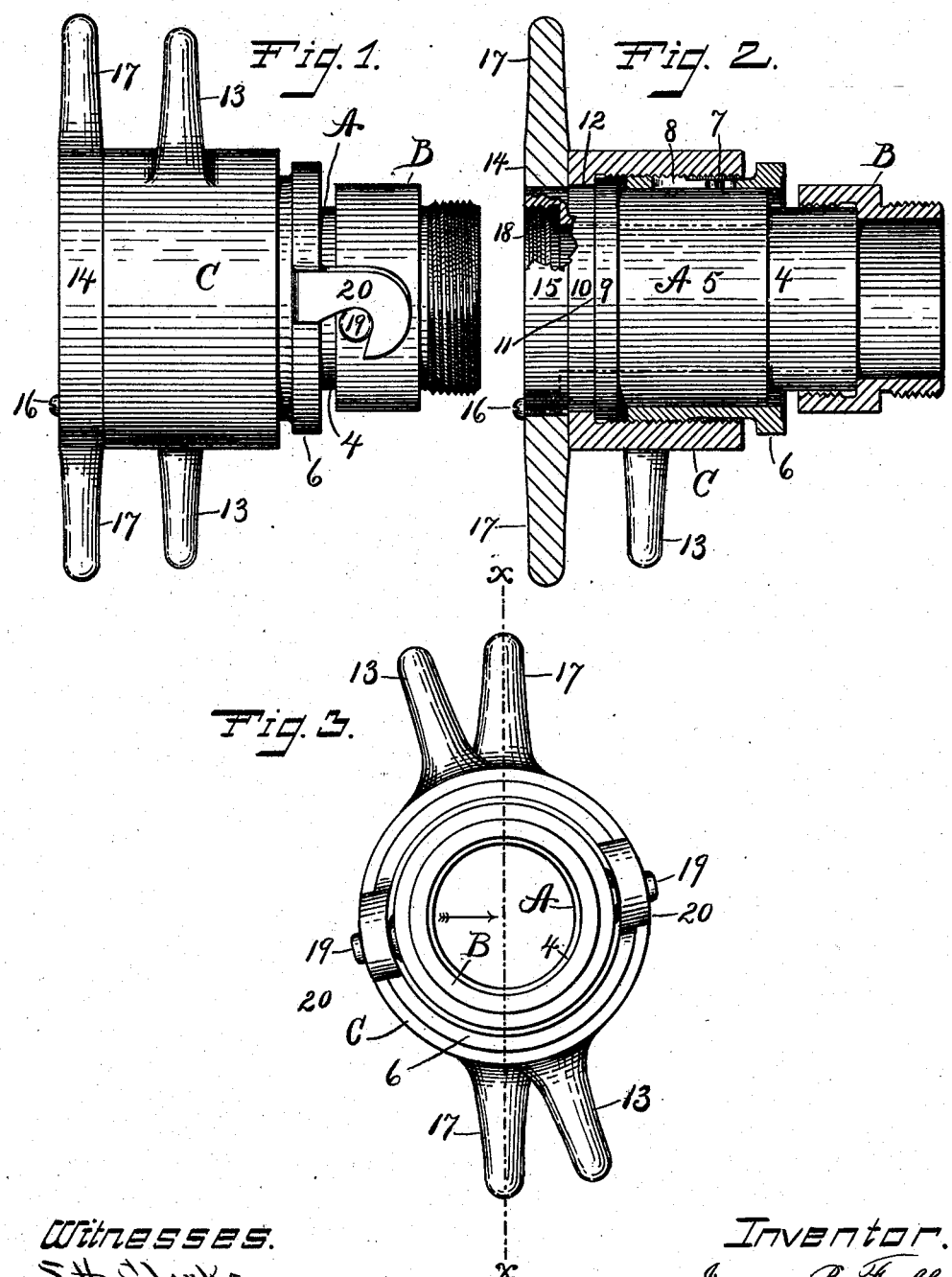

JEROME B. FULLER, OF NAUGATUCK, CONNECTICUT.

EMERGENCY-COUPLING FOR FIRE-HYDRANTS.

No. 911,123.  Specification of Letters Patent.  Patented Feb. 2, 1909.

Application filed October 8, 1906. Serial No. 338,061.

*To all whom it may concern:*

Be it known that I, JEROME B. FULLER, a citizen of the United States, residing at Naugatuck, in the county of New Haven and State of Connecticut, have invented certain new and useful Improvements in Emergency-Couplings for Fire-Hydrants, of which the following is a specification.

My invention relates to improvements in emergency couplings for fire hydrants and the objects of my improvement are simplicity and economy in construction and convenience and efficiency in use.

In the accompanying drawing:—Figure 1 is a side elevation of my coupling together with a hose connection that is coupled thereto. Fig. 2 is a longitudinal section of the same on the line $x\ x$ of Fig. 3, the body of the coupling being mainly shown in side elevation with a small portion in broken out section. Fig. 3 is an end view of the same showing the outer end.

A designates the tubular body of the coupling, upon which the other parts are mounted. This body has at its outer end an unthreaded cylindrical nib 4 that is designed to loosely fit the interior of the threaded bell mouthed or shouldered end of an ordinary hose connection B. Adjoining the nib 4 is a cylindrical portion 5 of a larger diameter than 4, upon which portion 5, the non-rotary and longitudinally sliding sleeve 6 is fitted and held against rotation by means of a pin 7 fixed in the body A and a longitudinal slot 8 in the sleeve, the said pin and slot connection being a well known means of preventing the rotation of one part upon another while at the same time it is free to slide longitudinally thereon. Other known and ordinary means for this purpose may be employed as the equivalent of the said pin and slot connection. This pin and slot connection also limits the outward longitudinal movement of the sleeve 6. The sleeve 8 is exteriorly threaded for a portion of its length. Adjoining the cylindrical portion 5, upon which the sleeve 6 slides, is an enlargement 9 and a short cylindrical portion 10 of a smaller diameter than 9 so as to form a rearwardly facing retaining shoulder 11 on that side of the enlargement 9 which is opposite the sleeve 6.

C designates a rotary driver in the form of a nut interiorly threaded throughout the main portion of its length and of a diameter to fit the threaded exterior of the sleeve 6, while its inner or rear end is of a reduced diameter as at 12 and is fitted to the short cylindrical portion and shoulder 11 on the body A. This driver or nut is or may be provided with any suitable operating handles as for example the handles 13. It is prevented from moving outwardly by its engagement with the shoulder 11 and from moving longitudinally in the opposite direction by engaging means in the form of a ring 14 that is fitted to a reduced portion 15 adjoining the cylindrical portion 10 with a rearwardly facing shoulder between them at the rear or inner end of the body A. This ring is fixedly mounted on the body A so as to rotate therewith the same as if formed in one piece therewith, but is made separate and secured in place for convenience of assembling the parts. As shown, it is secured by means of a screw pin or key 16, that is placed in the seam with half of its body in the ring and half in the body A, in the well known manner of keying two parts together. The ring 14 is provided with projections 17 that serve as handles for convenience of rotating the complete coupling. The body A is internally threaded at its rear end as at 18, Fig. 2, and this thread will be made to fit the fire hydrants of a town, or city, or private plant where the emergency couplings are to be used.

The ordinary hose connection is provided with side projections 19 for convenience in rotating it when screwed upon a hydrant and also for convenience of being connected with some other coupling that engages the said projections. The outer end of the non-rotating sleeve 6 is provided with means for engaging a hose connection the said means being in the form of oppositely facing hooked ears or lugs 20 that are specially adapted to engage the said side projections 19 of the hose connection.

The fire hydrants in different cities or places are variously threaded and thus when outside aid is called it frequently happens that the hose connections of the assisting party will not fit the threads of the nibs on the hydrants, although they may be of the same diameters. My emergency coupling is designed to enable any city, place, or plant, to couple any hose of a given size to their hydrants no matter what number of threads to the inch the hose connection may have. The coupling body will therefore be made to fit the hydrants of the city, place, or plant, where it is to be used. It is placed upon the hydrant when wanted by screwing the body A thereon in the ordinary manner. When once in place the body A, together with the ring 14 will remain stationary thereon. If the thread on the hydrant and the corresponding thread 18 of the coupling is right handed, as it ordinarily is then the thread of the driver or nut and sleeve will preferably be left handed, so that the body will not be unscrewed when the nut is screwed up. The nut turns loosely on the body but has no substantial longitudinal movement thereon. When threaded as above described, turning the nut or driver in the left handed direction will move the non-rotating slidable sleeve outwardly and vice versa. In private plants a coupling may be furnished for each hydrant and placed on them to remain there ready for use. In town and city streets, the couplings would generally be removed after each use.

In order to attach a hose, the hose connection with hose attached, is placed over the nib 4 of the coupling with the end of the nib in contact with the internal shoulder of the hose connection, or in contact with a packing that lies between the said end and shoulder. The nut or driver is then turned in the direction to force the sleeve 6 outwardly until the under side of the hooks are carried beyond the plane of the side projections 19. The hose connection is then rotated a small fraction of a revolution to carry the said projections under the hooked lugs 20, after which the nut C is turned in the reverse direction to draw the sleeve inwardly and to draw the lugs 20 of the sleeve against the projections 19 on the hose connection and then by screwing the nut up firmly bind the shoulder of the said connection against the end of the nib 4 so as to make a tight joint. The hose connection may be detached by turning the nut or driver in the reverse direction to release the lugs 20 from the projections 19. If the nut is turned so as to force the sleeve outwardly to its full limit or nearly so, before the hose connection is applied, then the hose connection when applied would first be stopped by having its largest end strike the outer end of the sleeve, instead of being stopped by the internal shoulder and end of the nib as before described. In either case the hose connection is placed in position with the projections 19 in a position to clear the hooked lugs, then turned a little on its axis to bring the projections under the lugs and then tightened by turning the driver to drive in the sleeve until the hose connection is tight.

By my improvement there is only one piece to rotate, after the hose connection is in place, and as the sleeve which binds the connection in place is a non-rotary piece, there is no rotation of the hose connection in tightening it up and no tendency to twist the hose. Neither does the operator have to hold any one piece against rotation while he is rotating another piece. The construction is simple and inexpensive, the coupling is convenient to handle, is readily understood, and is efficient and durable in use. All of the threads are housed so as to protect them from injury.

The internal thread 18 at the rear or inner end of the body is within the separately formed ring 14, and close to the inner end of the rotary driver C, whereby the body is shortened in length.

I claim as my invention:—

In a coupling, the combination of a tubular coupling body A having at its smaller end a nib to receive a hose connection, a cylindrical portion 5, an enlarged shouldered portion 9 having a rearwardly facing shoulder 11, a short cylindrical portion 10 at the rear of the said rearwardly facing shoulder and of a smaller diameter than the said enlarged portion on which the said shoulder is formed, a cylindrical portion 15 of a slightly smaller diameter than the short cylindrical portion 10 with a shallow rearwardly facing shoulder at the junction of the said portions 10 and 15, and an internally threaded portion 18 at its rear end for fitting a hydrant nib, with a non-rotating sleeve slidingly mounted for moving longitudinally on the said cylindrical portion 5 in front of the said enlarged shouldered portion 9, means for engaging a hose connection at the outer end of the said sleeve and an externally threaded portion of a diameter a little in excess of the said enlarged shouldered portion 9, an internally threaded rotary driver having at its front end an internally threaded portion to fit the externally threaded portion of the sliding sleeve and of a diameter to let the enlarged shouldered portion 9 pass therethrough, and an inwardly projecting portion at its rear end of a reduced diameter as compared with the internally threaded portion of the said driver, the said inwardly projecting portion being fitted to the rearwardly facing shoulder of the enlarged shoulder portion and the adjoining cylindrical portion, and a separately formed ring 14 fixedly mounted upon the cylindrical portion 15 immediately surrounding the internally threaded portion 18 and with the front side of the said ring in engagement with the rearwardly facing shoulder at the junction of the said portions 15 and 10 and also with the rear end of the driver, whereby the coupling is compact in the direction of its length and the rear end of the rotary driver comes closely to the hydrant nib.

JEROME B. FULLER.

Witnesses:
D. P. MILLS,
A. H. DAYTON.